(12) United States Patent
Ketteler et al.

(10) Patent No.: US 8,515,620 B2
(45) Date of Patent: Aug. 20, 2013

(54) MOTOR VEHICLE AND METHOD FOR ADJUSTING ASSEMBLIES THEREOF ON THE DRIVE TRAIN SIDE

(75) Inventors: Karl-Hermann Ketteler, Markdorf (DE); Thomas Winstel, Friedrichshafen (DE); Guenther Horsak, Meckenbeuren (DE); Marc Wiesenthal, Osnabruck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1004 days.

(21) Appl. No.: 12/529,283

(22) PCT Filed: Feb. 28, 2008

(86) PCT No.: PCT/EP2008/052440
§ 371 (c)(1),
(2), (4) Date: Sep. 3, 2009

(87) PCT Pub. No.: WO2008/110464
PCT Pub. Date: Sep. 18, 2008

(65) Prior Publication Data
US 2010/0094504 A1    Apr. 15, 2010

(30) Foreign Application Priority Data
Mar. 9, 2007   (DE) .................. 10 2007 011 459

(51) Int. Cl.
*B60G 3/26* (2006.01)
(52) U.S. Cl.
USPC ................... 701/39; 701/36; 701/37; 701/48; 701/29.1; 280/5.5; 280/5.52; 280/5.521; 280/5.522; 280/124.1

(58) Field of Classification Search
None
See application file for complete search history.

(56) References Cited

U.S. PATENT DOCUMENTS

| | | | | |
|---|---|---|---|---|
| 4,265,537 A | * | 5/1981 | Hunter | 356/155 |
| 4,338,027 A | * | 7/1982 | Eck | 356/155 |
| 4,371,191 A | * | 2/1983 | Goldberg et al. | 280/5.501 |
| 4,625,993 A | * | 12/1986 | Williams et al. | 280/5.507 |
| 5,143,400 A | * | 9/1992 | Miller et al. | 280/5.522 |
| 5,435,193 A | * | 7/1995 | Halliday | 73/862.541 |
| 5,531,030 A | * | 7/1996 | Dale, Jr. | 33/203 |
| 5,586,062 A | * | 12/1996 | Colarelli, III | 700/279 |
| 5,821,434 A | * | 10/1998 | Halliday | 73/862.541 |
| 6,279,920 B1 | * | 8/2001 | Choudhery | 280/5.521 |
| 6,293,561 B1 | | 9/2001 | Goetzen et al. | |
| 6,404,486 B1 | * | 6/2002 | Nobis et al. | 356/139.09 |
| 6,414,304 B1 | * | 7/2002 | Boess et al. | 250/231.13 |
| 7,100,289 B1 | * | 9/2006 | Strege et al. | 33/203 |
| 7,234,708 B2 | * | 6/2007 | Blondelet et al. | 280/5.521 |

(Continued)

FOREIGN PATENT DOCUMENTS

| | | |
|---|---|---|
| DE | 197 17 569 A1 | 10/1998 |
| DE | 198 50 076 A1 | 5/2000 |
| DE | 198 57 394 A1 | 6/2000 |
| DE | 100 07 658 A1 | 10/2001 |

*Primary Examiner* — Jonathan M Dager
(74) *Attorney, Agent, or Firm* — Davis & Bujold, PLLC

(57) ABSTRACT

A motor vehicle, with a drive train comprising a drive assembly, a transmission and wheels (2). The drive train further including actuators (3, 4) for adjusting at least one of the tracking and/or the camber. Sensors (5), for determining the tracking and/or camber, are integrated in the motor vehicle, and a control unit (6) only operates the actuators (3, 4), to adjust the tracking and/or the camber, when the drive train is in a defined actual static condition.

17 Claims, 2 Drawing Sheets

(56) References Cited

U.S. PATENT DOCUMENTS

| | | | |
|---|---|---|---|
| 7,314,221 B1* | 1/2008 | Everlith | 280/5.509 |
| 7,673,883 B2* | 3/2010 | Damm | 280/5.521 |
| 7,784,805 B2* | 8/2010 | Morgan | 280/124.134 |
| 7,950,680 B2* | 5/2011 | Christensen | 280/124.135 |
| 2001/0035617 A1* | 11/2001 | Choudhery | 280/5.521 |
| 2002/0036385 A1* | 3/2002 | Mackle et al. | 280/5.521 |
| 2003/0111812 A1* | 6/2003 | Carlstedt et al. | 280/124.16 |
| 2004/0061100 A1* | 4/2004 | Keaton et al. | 254/90 |
| 2005/0027473 A1* | 2/2005 | Davidson et al. | 702/151 |
| 2005/0030525 A1* | 2/2005 | Forster et al. | 356/139.09 |
| 2006/0064275 A1* | 3/2006 | Phillips | 702/154 |
| 2006/0174501 A1* | 8/2006 | Harrill | 33/288 |
| 2008/0016707 A1* | 1/2008 | Rogers | 33/203.18 |
| 2008/0067772 A1* | 3/2008 | Weagle | 280/124.134 |
| 2008/0238005 A1* | 10/2008 | James | 280/5.509 |
| 2010/0013176 A1* | 1/2010 | Aramah et al. | 280/5.521 |
| 2010/0219600 A1* | 9/2010 | Dada | 280/124.127 |
| 2011/0095502 A1* | 4/2011 | Dada | 280/124.127 |
| 2011/0131025 A1* | 6/2011 | Corghi | 703/8 |

* cited by examiner

MOTOR VEHICLE AND METHOD FOR ADJUSTING ASSEMBLIES THEREOF ON THE DRIVE TRAIN SIDE

This application is a National Stage completion of PCT/EP2008/052440 filed Feb. 28, 2008, which claims priority from German patent application serial no. 10 2007 011 459.3 filed Mar. 9, 2007.

FIELD OF THE INVENTION

The invention concerns a motor vehicle and a method for adjusting drivetrain-related assemblies of a motor vehicle.

BACKGROUND OF THE INVENTION

The driving behavior of a motor vehicle and its tire wear are determined in particular by the so-termed camber and tracking of the motor vehicle's wheels. Camber is the oblique position of a wheel plane relative to a perpendicular to the road, transversely to the longitudinal axis of the vehicle. Tracking is the oblique position of the wheel plane relative to the longitudinal axis of the vehicle when it is driving straight ahead. In motor vehicles known until now the camber and tracking can be adjusted by measuring the tracking and camber in the workshop on an axis measuring bench, and on the basis of the measurement, adjusting the tracking and camber manually.

DE 198 57 394 C2 describes an adjustable suspension system for a chassis of a motor vehicle, with actuators inside the motor vehicle for simultaneous and independent steering, suspension, tracking adjustment, camber adjustment and wheelbase alteration, such that on the basis of condition and operating parameters of the motor vehicle a control unit generates control signals for the actuators. This takes place in order to provide a dynamically active chassis during driving, in which redundancy is ensured in that each wheel of the motor vehicle is acted upon by at least two actuators.

SUMMARY OF THE INVENTION

Starting from there, the present invention addresses the problem of providing a new type of motor vehicle and a method for adjusting drivetrain-related assemblies thereof.

According to the invention sensors for the detection of tracking and/or camber are integrated in the motor vehicle, and a control device only operates the actuators when the drivetrain is in a defined actual static condition.

With the invention described here, static monitoring and correction of the tracking and/or camber in a motor vehicle can be carried out in a manner self-sufficient for the vehicle, for example to compensate for irreversible deformations in the drivetrain caused by overloading or wear. Only when the drivetrain adopts a defined actual static condition are drivetrain-related actuators operated, in the sense of the invention in order to adjust the tracking and/or camber. An appropriate defined actual static condition of the motor vehicle exists, for example, when during or after re-starting, the motor vehicle is at rest and a steering angle is approximately zero. In addition it can be provided that operation of the drivetrain-related actuators to adjust the tracking and/or camber is only permitted when a corresponding function is activated and cleared in a workshop.

BRIEF DESCRIPTION OF THE DRAWINGS

Preferred further developments of the invention emerge from the description given below. Example embodiments of the invention, to which it is not limited, are explained in more detail with reference to the attached drawings, which show.

DETAILED DESCRIPTION OF THE PREFERRED EMBODIMENTS

Figure 1:
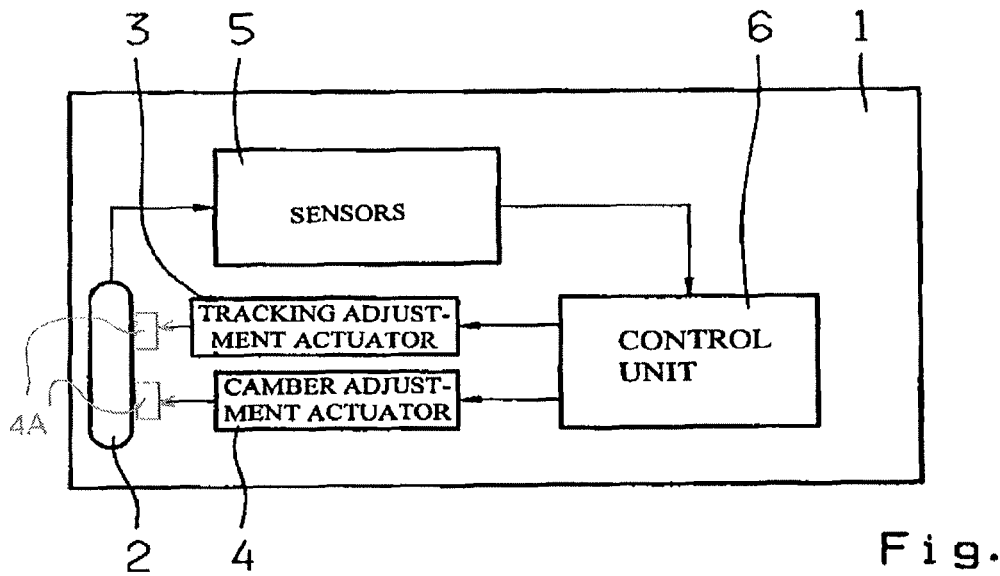
FIGS. 1 and 1A: Very schematic block diagrams of a motor vehicle according to the invention.
Figure 1A:
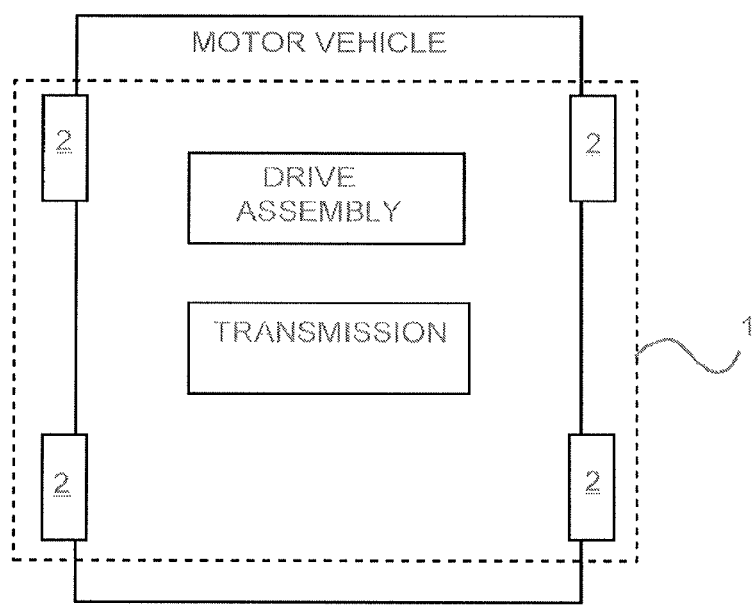

As show in FIG. 1A, the present invention relates to a motor vehicle and a method for the adjustment of drivetrain-related assemblies of a motor vehicle, such that besides a drive assembly and a transmission the motor vehicle's drivetrain 1 also comprises wheels 2.

FIG. 1 shows a very schematic representation of a drivetrain 1 of a motor vehicle according to the invention, in the area of a wheel 2, such that as shown in FIG. 1 the drivetrain 1 and thus the motor vehicle has at least one actuator 3 for adjusting the tracking and at least one actuator 4 for adjusting the camber of the wheel 2. The actuators 3 and 4 are either electric motor actuators, hydraulic actuators or pneumatic actuators. The actuators act upon longitudinally adjustable track-rods 4A of a front and/or a rear axle, to adjust the tracking and/or camber of the wheel concerned.

Furthermore, sensors 5 are integrated in the drivetrain 1 and hence the motor vehicle, in order to measure the tracking and/or camber of the wheel 2 concerned. The sensors 5 can detect the position of a wheel plane of the wheels 2 on a front axle and/or a rear axle, these vehicle-internal or drivetrain-internal sensors 5 for detecting the tracking and/or camber preferably being in the form of distance sensors which detect the three-dimensional, absolute position of the wheel plane of the wheel 2 concerned relative to the motor vehicle axis concerned, three-dimensionally in space.

The sensors 5, preferably made as distance sensors, can detect the position of the wheel plane of the wheel 2 concerned in three dimensions and absolutely, independently of any suspension movement of the wheel 2 in question.

According to FIG. 1, the measured tracking and/or camber values determined by the sensors 5 are used in a control unit 6 to generate control signals for the actuators 3, 4 in order to adjust the tracking and/or camber. In the context of the present invention, the control unit 6 only operates the actuators 3, 4 when the drivetrain 1 is in a defined actual static condition. Accordingly, only when defined static boundary conditions for the condition of the drivetrain are fulfilled, do the actuators 3, 4 act in the sense of the present invention to adjust the tracking and/or camber of the respective wheel 2 of the drivetrain 1 of the motor vehicle according to the invention.

From this it follows that the control unit 6 only operates the actuators 3, 4 on the basis of the measured values provided by the sensors 5 when the drivetrain 1 adopts a defined actual static condition. Likewise, it is also possible for the sensors 5 to only provide the control unit 6 with measured values when the drivetrain 1 adopts the defined static actual condition.

Preferably, such a defined actual static condition exists when the motor vehicle is at rest and preferably, at the same time, when the steering angle is approximately zero. Then, for example, whenever the motor vehicle is started again when at rest and at the same time with a steering angle of zero, in accordance with the invention, the tracking and/or camber of the wheels 2 of the drivetrain 1 is/are adjusted.

An alternative possibility is that whenever a motor vehicle is restarted from rest with a steering angle of zero, measured tracking and/or camber values are detected by the sensors 5 and if deviations from corresponding nominal values are detected, an error input is stored in the control unit 6.

On the basis of such an error input stored in the control unit 6, during a visit to a workshop a maintenance instrument can for example be connected to the electronic system of the motor vehicle and the operation of the vehicle-internal actuators 3 and 4 can thereby be authorized by the control unit 6, so that the tracking and/or camber are adjusted exclusively when in the workshop.

Figure 2:
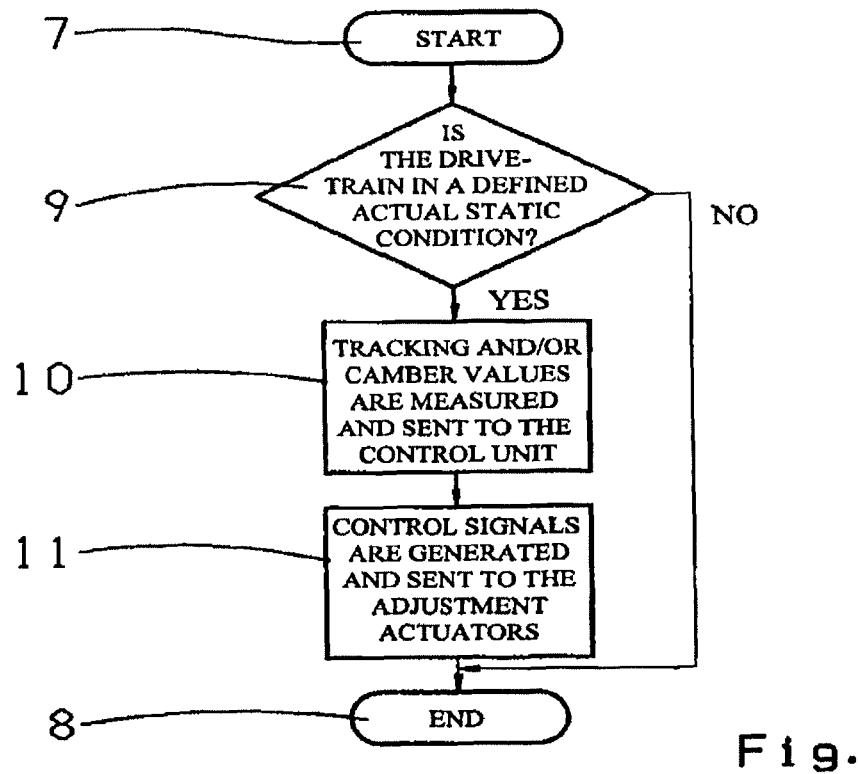
FIG. 2: Signal flow diagram for further clarification of the invention.

FIG. 2 clarifies the invention with reference to a signal flow diagram of the method according to the invention for adjusting drivetrain-related assemblies of a motor vehicle to influence the tracking and/or camber, a step 7 corresponding to the beginning of the process according to the invention and a step 8 corresponding to its end.

After the initiation of the method according to the invention in step 7, for example after restarting the motor vehicle, in a step 9 it is checked whether the drivetrain is in a defined actual static condition so that the method according to the invention can be pursued further. If this is not so, i.e. if the drivetrain is not in a defined actual static condition, then starting from step 9 the system branches back to step 8 and the process ends.

At this point it should again be said that for the defined actual static condition of the drivetrain checked in step 9 of the method according to the invention, the check can for example be whether the motor vehicle is at rest and at the same time a steering angle is approximately zero. This can take place each time the motor vehicle is restarted.

On the other hand, if it is found in step 9 that the drivetrain is in a defined static actual condition, then starting from step 9 the system branches to step 10.

In step 10, with the help of the sensors 5 on the wheels 2, measured tracking and/or camber values are determined and supplied to or read in by the control unit 6.

In the subsequent step 11, depending on the measured values from the sensors 5 the control unit 6 generates control signals for the actuators 3 and 4 to adjust the tracking and/or camber. During this, the control signals produced are such that the actual tracking and/or camber values determined by the sensors 5 are adjusted toward predetermined nominal values.

Accordingly, the present invention proposes that actual tracking and/or camber values in a motor vehicle are determined by drivetrain-internal sensors and, depending on these, control signals for drivetrain-internal actuators are generated by a control unit of the motor vehicle to adjust the tracking and/or camber, but only when the drivetrain is in a defined actual static condition. This tracking and/or camber adjustment can take place either automatically, for example each time the motor vehicle is restarted, or after activation in a workshop.

Indexes
1. Drivetrain
2. Wheel
3. Actuator
4. Actuator
5. Sensor
6. Control unit
7. Process step
8. Process step
9. Process step
10. Process step
11. Process step

The invention claimed is:

1. A motor vehicle with a drivetrain comprising a drive assembly, a transmission and wheels, and the drivetrain also comprising actuators for adjusting at least one of tracking and camber,
   sensors (5), for determining at least one of the tracking and the camber, being integrated in the motor vehicle,
   a control unit (6) being integrated in the motor vehicle and connected to the sensors (5) for receiving determined values from the sensors;
   the control unit only operating the actuators (3, 4) when the drivetrain is in a defined actual static condition, and
   the control unit (6) operating the actuators (3, 4) based on measured values supplied by the sensors (5), only when at least one of the motor vehicle is at rest and a steering angle is approximately zero.

2. The motor vehicle according to claim 1, wherein the actuators (3, 4) act upon longitudinally adjustable tracking rods of at least one of a front and a rear axle to adjust actively at least one of the tracking and the camber as a function of measured tracking and measured camber values.

3. The motor vehicle according to claim 1, wherein the sensors (5) detect a position of a wheel plane of the wheels of at least one of the front and the rear axle.

4. The motor vehicle according to claim 3, wherein the sensors (5) are distance sensors which detect a three-dimensional, absolute position of the wheel plane of the respective motor vehicle axle.

5. A motor vehicle with a drivetrain comprising a drive assembly, a transmission and wheels, and the drivetrain also comprising actuators for adjusting at least one of tracking and camber;
   sensors (5), for determining at least one of the tracking and the camber, being integrated in the motor vehicle;
   a control unit (6) being integrated in the motor vehicle and connected to the sensors (5) for receiving determined values from the sensors;
   the control unit only operating the actuators (3, 4) when the drivetrain is in a defined actual static condition; and
   the sensors (5) only supplying measured values for the control unit (6) when at least one of the vehicle is at rest and a steering angle is approximately zero.

6. A method for adjusting drivetrain-related assemblies of a motor vehicle in which, the drivetrain comprises a drive assembly, a transmission and wheels, and at least one vehicle-internal actuator is provided for adjusting one of tracking and camber, the method comprising the steps of:
   determining at least one of a measured tracking value and a measured camber value by at least one vehicle-internal sensor;
   transmitting the at least one of the measured tracking value and the measured camber value to a control unit;
   directing, via the control unit, the at least one vehicle-internal actuator to adjust at least one of the tracking and the camber;
   adjusting at least one of the tracking and the camber, by the at least one vehicle-internal actuator, only when the drivetrain is determined to be in a defined actual static condition; and
   operating the vehicle-internal actuators on a basis of at least one of the measured tracking and the measured camber values, supplied by the sensors, only when the motor vehicle is at rest and a steering angle is approximately zero.

7. The method according to claim 6, further comprising the step of the control unit automatically directing the at least one vehicle-internal actuator to adjust at least one of the tracking and the camber.

8. A method of adjusting drivetrain-related assemblies of a motor vehicle in which the drivetrain comprises a drive assembly, a transmission and wheels, and at least one vehicle-internal actuator is provided for adjusting one of tracking and camber, the method comprising the steps of:

- determining at least one of a measured tracking value and a measured camber value by at least one vehicle-internal sensor:
- transmitting the at least one of the measured tracking value and the measured camber value to a control unit;
- directing, via the control unit, the at least one vehicle-internal actuator to adjust at least one of the tracking and the camber;
- adjusting at least one of the tracking and the camber, by the at least one vehicle-internal actuator, only when the drivetrain is determined to be in a defined actual static condition; and
- supplying at least one of the measured tracking and the measured camber values from the sensors only when the motor vehicle is at rest and a steering angle is approximately zero.

9. The method according to claim 6, further comprising the step of determining, with the sensors, actual values of at least one the tracking and the camber at the wheels, after the motor vehicle is restarted and when the motor vehicle is at rest and the steering angle is approximately zero.

10. The method according to claim 9, further comprising the step of generating control signals for operating the actuators to adjust at least one of the tracking and the camber when a deviation from at least one of a nominal tracking value and a nominal camber value is detected.

11. The method according to claim 9, further comprising the step of storing an error input when the deviation from at least one of the nominal tracking value and the nominal camber value is detected and authorizing the actuators to adjust at least one of the tracking and the camber, during a visit to a workshop, based on the error input.

12. A motor vehicle with a drivetrain comprising a drive assembly, a transmission and wheels, and the drivetrain also comprising actuators for adjusting at least one of tracking and camber,

- a plurality of sensors (5), for determining at least one of the tracking and the camber, being integrated in the motor vehicle,
- a control unit (6) being integrated in the motor vehicle and connected to the sensors (5) for receiving determined values from the sensors; and
- the control unit automatically operating the actuators (3, 4) only when the drivetrain is in a defined actual static condition.

13. The motor vehicle according to claim 12, wherein the actuators (3, 4) act upon longitudinally adjustable tracking rods of at least one of a front and a rear axle to adjust actively at least one of the tracking and the camber as a function of measured tracking values and measured camber values.

14. The motor vehicle according to claim 12, wherein the sensors (5) detect a position of a wheel plane of the wheels of at least one of the front and the rear axle.

15. The motor vehicle according to claim 14, wherein the sensors (5) are distance sensors which detect a three-dimensional position of the wheel plane of at least one motor vehicle axle.

16. The motor vehicle according to claim 12, wherein the control unit (6) only operates the actuators (3, 4), based on measured values supplied by the sensors (5), when the motor vehicle is at least one of at rest and a steering angle is approximately zero.

17. The motor vehicle according to claims 12, wherein the sensors (5) only supply measured values for the control unit (6) when the vehicle is at least one of at rest and a steering angle is approximately zero.

* * * * *